(12) United States Patent
Wang et al.

(10) Patent No.: US 9,240,160 B2
(45) Date of Patent: Jan. 19, 2016

(54) DRIVING CIRCUIT AND DISPLAY DEVICE OF USING SAME

(71) Applicant: AU Optronics Corporation, Hsinchu (TW)

(72) Inventors: Hung-Chi Wang, Hsinchu (TW); Wen-Chiang Huang, Hsinchu (TW); Meng-Ju Wu, Hsinchu (TW); Rung-Yuan Chang, Hsinchu (TW); Chun-Fan Chung, Hsinchu (TW)

(73) Assignee: AU OPTRONICS CORPORATION, Hsinchu (TW)

( * ) Notice: Subject to any disclaimer, the term of this patent is extended or adjusted under 35 U.S.C. 154(b) by 323 days.

(21) Appl. No.: 13/769,577

(22) Filed: Feb. 18, 2013

(65) Prior Publication Data

US 2014/0232755 A1    Aug. 21, 2014

(51) Int. Cl.
*G09G 5/10* (2006.01)
*G09G 3/36* (2006.01)
*G02F 1/1345* (2006.01)
*G09G 3/20* (2006.01)
*G09G 5/00* (2006.01)

(52) U.S. Cl.
CPC .............. *G09G 5/10* (2013.01); *G02F 1/13452* (2013.01); *G09G 3/20* (2013.01); *G09G 3/3696* (2013.01); *G09G 5/003* (2013.01); *G09G 2310/027* (2013.01); *G09G 2320/0673* (2013.01); *G09G 2370/08* (2013.01)

(58) Field of Classification Search
CPC ............. G02F 1/13452; G09G 3/3685; G09G 3/3696; G09G 2310/027; G09G 2310/0281; G09G 2300/0426
See application file for complete search history.

(56) References Cited

U.S. PATENT DOCUMENTS

| | | | |
|---|---|---|---|
| 6,151,006 A * | 11/2000 | Yanagi et al. | 345/94 |
| 7,876,315 B2 | 1/2011 | Suzuki et al. | |
| 2005/0286004 A1* | 12/2005 | Lee | 349/148 |
| 2007/0115243 A1 | 5/2007 | Kim et al. | |
| 2008/0225036 A1* | 9/2008 | Song et al. | 345/213 |
| 2009/0021462 A1* | 1/2009 | Furihata et al. | 345/89 |
| 2009/0021504 A1 | 1/2009 | Oh Yang et al. | |

FOREIGN PATENT DOCUMENTS

| | | |
|---|---|---|
| CN | 101266762 A | 9/2008 |
| JP | 2007235798 A | 9/2007 |
| KR | 20100070739 A | 6/2010 |

* cited by examiner

*Primary Examiner* — Priyank Shah
(74) *Attorney, Agent, or Firm* — Tim Tingkang Xia, Esq.; Locke Lord LLP

(57) ABSTRACT

In one aspect of the invention, a driving circuit has a PCB, a transmitter disposed on the PCB for providing an input signal, first and second transmission lines disposed on the PCB and electrically coupled to the transmitter for transmitting the input signal, and a plurality of source drivers formed in a COF architecture disposed between the PCB and the display panel. The input signal is an encoded signal including first and second Gamma reference voltages control signals, and image data. The first and second Gamma reference voltages are transmitted by the PLC technology through the first and second transmission lines, respectively. The driving circuit is implemented with differential transmission of the Gamma voltages, the image data and the control signals.

18 Claims, 11 Drawing Sheets

DRIVING CIRCUIT AND DISPLAY DEVICE OF USING SAME

FIELD OF THE INVENTION

The disclosure relates generally to a display device, and more particularly to a driving circuit that utilizes the power line communication (PLC) technology in the Gamma voltage transmission paths to transmit the Gamma voltages, image data and control signals, and a display device of using the same.

BACKGROUND OF THE INVENTION

A common architecture of a source driver for a display device is a chip-on-glass (COG) architecture or a chip-on-film (COF) architecture. The former applies a flip chip bonding technology to directly dispose source driver integrated circuits (IC) onto a glass substrate, while the latter applies the flip chip bonding technology to directly dispose source driver IC and active components onto a flexible printed circuit board/film (PCB), which is in turn connected to a substrate.

Compared to the COF architecture, wires of the COG architecture are disposed on the glass substrate, which reduces the assembly area in the PCB. The COG architecture thus has a cost-effective advantage and is usually implemented in small size display panels. However, signals can easily be reflected in the transmission channels in the COG architecture, thereby causing poor signal quality. In addition, re-working may cause damages to the display panel. Further, the IC may be deformed at a high temperature.

For the COF architecture, signal reflections during the signal transmission are relatively small, and further, the transmitted signals have better quality. In addition, display panel damages due to bonding defects can be avoided. The COF architecture is more suited for large-size, high-resolution displays. However, because a great number of wires needs being laid on the PCB, a relatively large assembly area is required in the PCB. The wires and/or film of the COF architecture may also generate signal noises and causes heating problems.

Therefore, a heretofore unaddressed need exists in the art to address the aforementioned deficiencies and inadequacies.

SUMMARY OF THE INVENTION

In one aspect, the invention relates to a driving circuit for driving a display device having a display panel. In one embodiment, the driving circuit has a printed circuit board (PCB), a transmitter disposed on the PCB for providing an input signal comprising first and second Gamma reference voltages, VHigh and VLow, control signals, and image data, first and second transmission lines disposed on the PCB and electrically coupled to the transmitter for transmitting the input signal, wherein the first and second Gamma reference voltages are transmitted through the first and second transmission lines, respectively, and a plurality of source drivers formed in a chip-on-film (COF) architecture between the PCB and the display panel.

Each source driver comprises first and second Hi-z components electrically coupled to the first and second transmission lines, respectively, for preventing voltage drops of the input signal, first and second low pass filters electrically coupled to the first and second Hi-z components, respectively, for removing high frequency components of the input signal and outputting the first and second Gamma reference voltages, a plurality of resistors electrically coupled in series between the first and second low pass filters, for generating a plurality of Gamma voltages, a receiver having first and second inputs electrically coupled to the first and second transmission lines, respectively, for removing DC components of the input signal and outputting the image data and the control signals, and core circuits electrically coupled to the plurality of resistors and the receiver for generating gray-scale voltages responsive to the image data for driving corresponding data lines of the display panel.

In one embodiment, the first and second Gamma reference voltages are transmitted by the power-line communication technology to the first and second transmission lines.

In one embodiment, the image data and the control signals are transmitted through a high pass filter of the transmitter to the first and second transmission lines.

In one embodiment, each source driver further comprises a pair of capacitors, each capacitor electrically coupled between a respective transmission line and a respective input of the receiver, for removing DC component of the input signal and passing AC component of the input signal, a terminal supply voltage, Vterm, and one or more resistors electrically coupled between the terminal supply voltage Vterm and the first and second inputs of the receiver, for setting a voltage on receiver side of the pair of capacitors.

In one embodiment, each source driver further comprises a pre-charging circuit configured such that when the most significant bit (MSB) of the image data applied to a data line and the MSB of the image data applied to the immediately prior data line change from one state to another state, pre-charging to the data lines starts for a pre-charge period.

In one embodiment, power of the pre-charging is supplied by internal voltages, VH1 and VL1, provided by the plurality of resistors.

In one embodiment, the voltages VH1 and VL1 are designed to respectively satisfy the relationships of:

$$(1/2)*VHigh < VH1 < VHigh, \text{ and}$$

$$VLow < VL1 < (1/2)*VHigh.$$

In one embodiment, VH1=(3/4)*VHigh and VL1=(1/4)*VHigh.

In one embodiment, the pre-charging period is substantially coincident with a high-z time of the control signal STB.

In one embodiment, when a channel output to a data line has a positive polarity, the data line is pre-charged with VH1 in the high-z time of the control signal STB, and when a channel output to a data line has a negative polarity, the data line is pre-charged with VL1 in the high-z time of the control signal STB.

In another aspect, the invention relates to a driving circuit for driving a display device having a display panel. In one embodiment, the driving circuit includes a PCB, a transmitter disposed on the PCB for providing an input signal comprising a first Gamma reference voltage and control signals, first and second transmission lines disposed on the PCB and electrically coupled to the transmitter for transmitting the input signal, wherein the first Gamma reference voltage is transmitted through the first transmission line, and wherein the second transmission line is electrically coupled to ground, and a plurality of source drivers formed in a COF architecture between the PCB and the display panel.

Each source driver has first and second Hi-z components electrically coupled to the first and second transmission lines, respectively, for preventing voltage drops of the input signal, and outputting the first and second Gamma reference voltages, a plurality of resistors electrically coupled in series between the first and second low pass filters, for generating a plurality of Gamma voltages, a comparator having first and second inputs electrically coupled to the first transmission line and a reference voltage Vref, respectively, for outputting the control signals, and core circuits electrically coupled between the plurality of resistors and the comparator for generating gray-scale voltages for driving corresponding data lines of the display panel.

In one embodiment, the first and second Gamma reference voltages are transmitted by the power-line communication technology to the first and second transmission lines.

In one embodiment, the reference voltage Vref is provided externally.

In one embodiment, each source driver further comprises a pre-charging circuit configured such that when the MSB of the image data applied to a data line and the MSB of the image data applied to the immediately prior data line change from one state to another state, pre-charging to the data lines starts for a pre-charge period.

In one embodiment, power of the pre-charging is supplied by internal voltages, VH1 and VL1, provided by the plurality of resistors.

In one embodiment, the voltages VH1 and VL1 are designed to respectively satisfy the relationships of:

$(½)*VHigh<VH1<VHigh$, and $VLow<VL1<(½)*VHigh$.

In one embodiment, $VH1=(¾)*VHigh$ and $VL1=(¼)*VHigh$

In one embodiment, the pre-charging period is substantially coincident with a high-z time of the control signal STB.

In one embodiment, when a channel output to a data line has a positive polarity, the data line is pre-charged with VH1 in the high-z time of the control signal STB, and when a channel output to a data line has a negative polarity, the data line is pre-charged with VL1 in the high-z time of the control signal STB.

In another aspect, the invention relates to a method for driving a display device having a plurality of source drivers formed in a COF architecture. In one embodiment, the method includes the steps of generating first and second reference Gamma voltages of high-potential and low-potential supply, VHigh and VLow, wherein VHigh and VLow are corresponding to a highest gray-scale voltage and a lowest gray-scale supply voltage, respectively, transmitting the Gamma voltages, image data and control signals through first and second transmission lines by the power-line communication technology to the plurality of source drivers, maintaining the potential levels of the Gamma voltages by operational-amplifiers (OP) embedded in each source driver so as to prevent Gamma voltage drops, selecting Gamma voltages provided by a plurality of resistors connected in series between a highest gray-scale voltage and a lowest gray-scale supply voltage, removing Gamma amp offset voltages by Gamma switches of each source driver, pre-charging the data lines by the half-voltage technique so as to prevent thermal noises generated by the COF source drivers, and generating gray-scale voltages for channel outputs from core circuits of each source driver to a display panel of the display device.

In one embodiment, the step of selecting Gamma voltages is performed with a plurality of Gamma voltage selectors.

In one embodiment, when the MSB of the image data applied to a data line and the MSB of the image data applied to the immediately prior data line change from one state to another state, the pre-charging to the data lines starts for a pre-charge period.

In one embodiment, the pre-charging period is substantially coincident with a high-z time of the control signal STB.

In one embodiment, when a channel output to a data line has a positive polarity, the data line is pre-charged with VH1 in the high-z time of the control signal STB, and when a channel output to a data line has a negative polarity, the data line is pre-charged with VL1 in the high-z time of the control signal STB.

In one embodiment, power of the pre-charging is supplied by internal voltages, VH1 and VL1, provided by the plurality of resistors.

In one embodiment, the voltages VH1 and VL1 are designed to respectively satisfy the relationships of:

$(½)*VHigh<VH1<VHigh$, and $VLow<VL1<(½)*VHigh$.

In one embodiment, $VH1=(¾)*VHigh$ and $VL1=(¼)*VHigh$.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
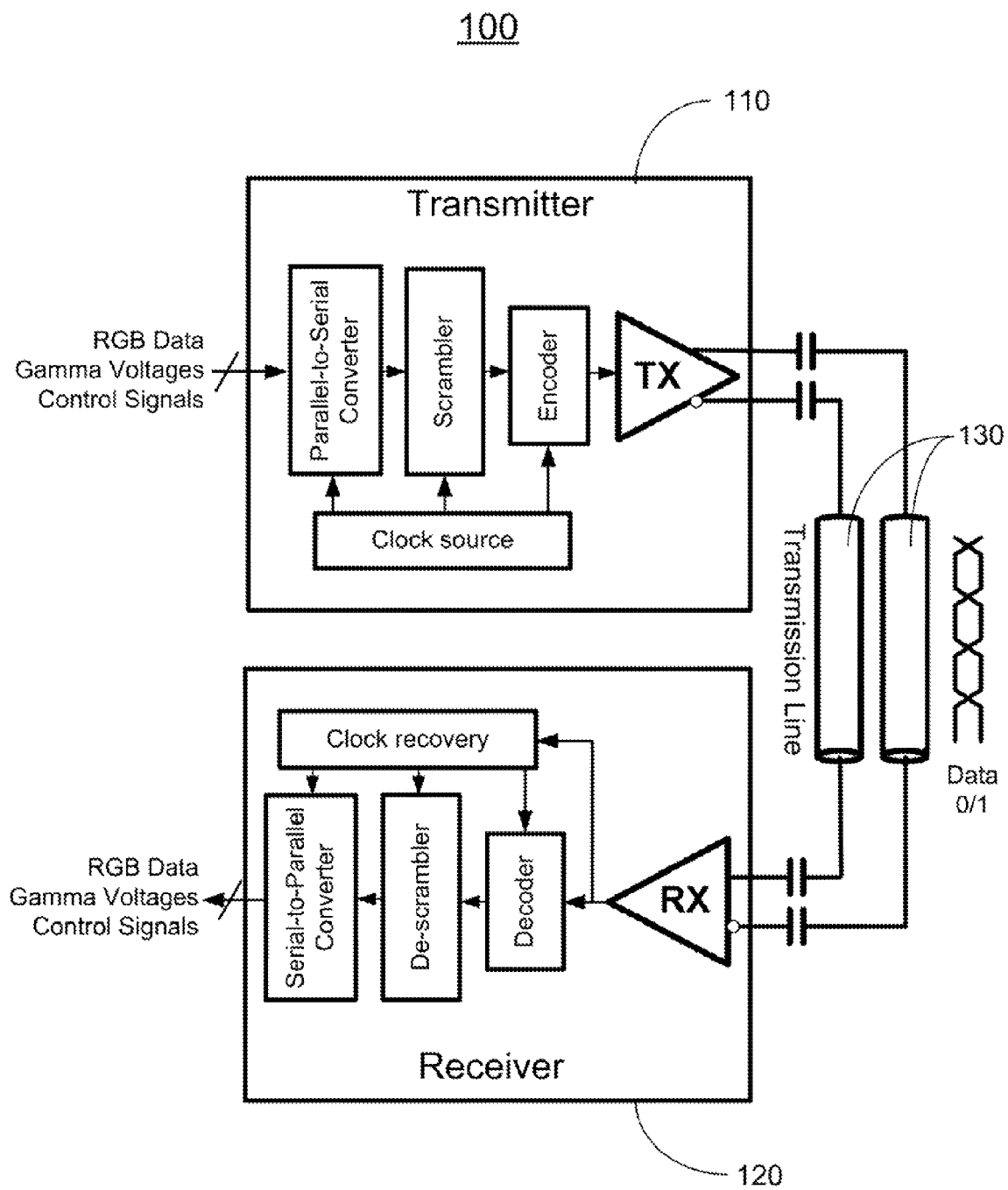
FIG. 1 shows schematically a TX and RX architecture utilizing the power line communication (PLC) technology to transmit image (RGB) data, Gamma voltages and control signals according to one embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top", may be used herein to describe one element's relationship to another element as illustrated in the FIGS. It will be understood that relative terms are intended to encompass different orientations of the device in addition to the orientation depicted in the FIGS. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

The description will be made as to the embodiments of the present invention in conjunction with the accompanying drawings in FIGS. 1-11. In accordance with the purposes of this invention, as embodied and broadly described herein, this invention, in one aspect, relates to a driving circuit that utilizes the power line communication (PLC) technology in the Gamma voltage transmission lines (paths) to transmit the Gamma voltages, image (RGB) data and control signals, and a display device of using the same. More specifically, the image data and the control signals are encoded by differential or single-end transmission methods, to the Gamma voltages. The encoded image data and control signals and the Gamma voltages are transmitted through the Gamma voltage transmission lines (paths). Accordingly, the wires needed for the signal transmission on the PCB are reduced, and thus, the size of the PCB can be reduced.

Referring to FIG. 1, TX and RX architecture 100 of a driving circuit of a display device, which utilizes the PLC technology to transmit image (RGB) data, Gamma voltages and control signals, is shown schematically according to one embodiment of the present invention. The TX and RX architecture 100 includes a transmitter 110, a receiver 120 and transmission lines (paths) 130 electrically connected between the transmitter 110 and the receiver 120. The transmission lines 130 are corresponding to the Gamma voltage (power) transmission paths. According to the invention, the RGB (image) data, the control signals and the Gamma voltages are encoded at the transmitter 110 by either a differential transmission method or a single-end transmission method. The encoded RGB (image) data, control signals and Gamma voltages are transmitted through the transmission lines 130 by the PLC technology. At the receiver 120, the received encoded signal of the RGB data, the control signals and the Gamma voltages through the transmission lines 130 is decoded, which are then output to a display panel of the display device.

Figure 2:
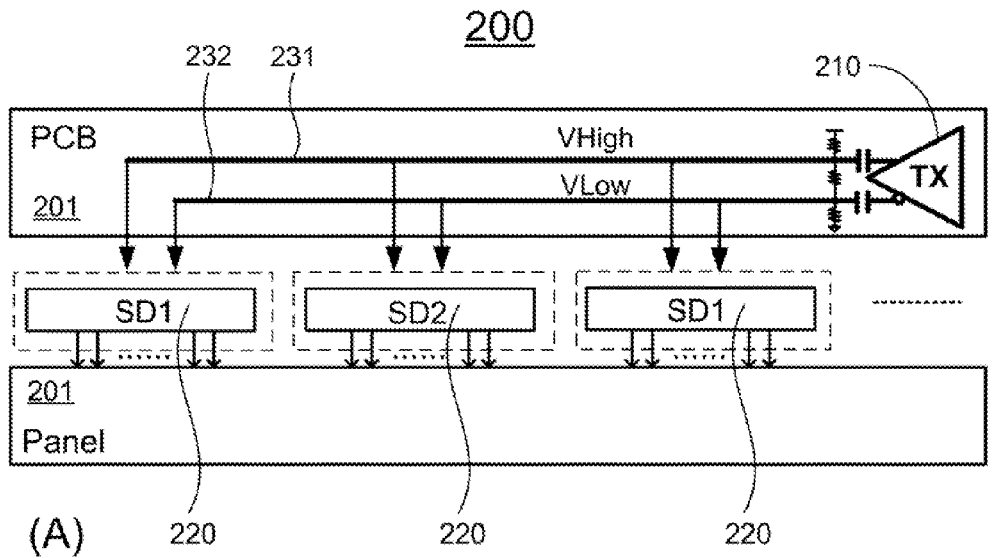
FIG. 2 shows schematically a COF architecture of a driving circuit for a display device that utilizes the PLC technology to transmit RGB data, Gamma voltages and control signals according to one embodiment of the present invention, (A) the driving circuit, and (B) a source driver.
Figure 2:
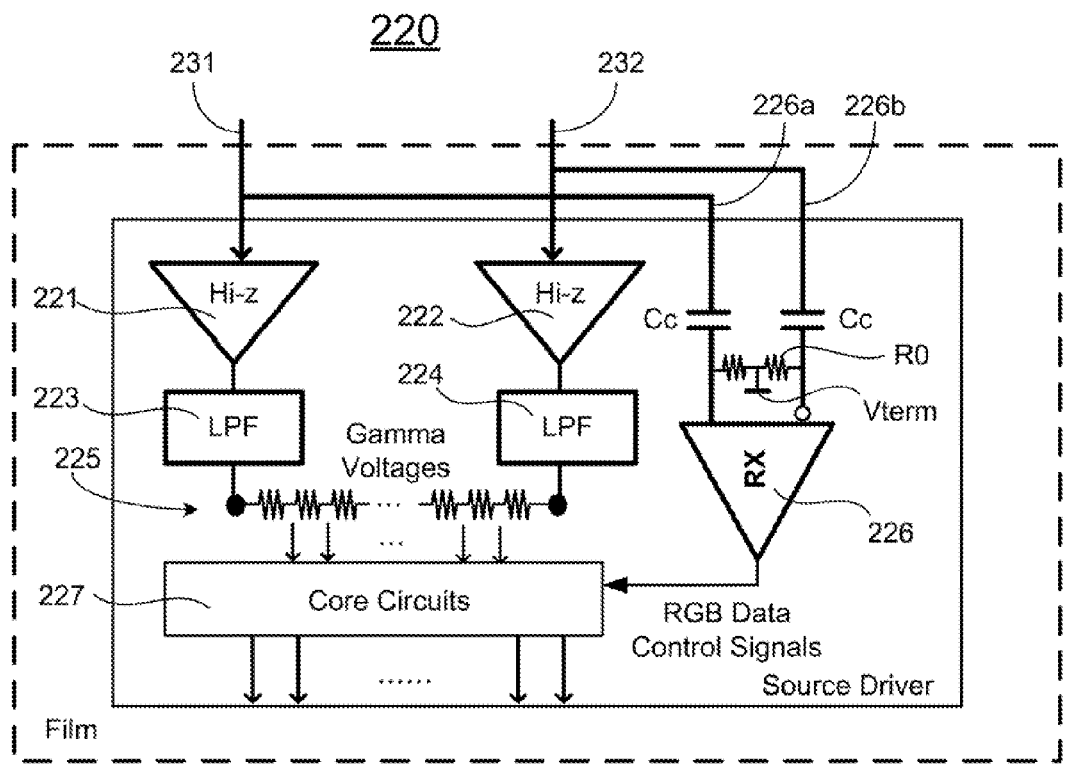

Referring to FIG. 2, a COF architecture 200 (FIG. 2A) of a driving circuit for a display panel and a source driver 210 (FIG. 2B) utilized in the COF architecture 200 of the driving circuit are shown schematically according to one embodiment of the present invention.

The driving circuit 200 has a printed circuit board (PCB) 201, a transmitter 210 disposed on the PCB 201 for providing an input signal, first and second transmission lines 231 and 231 disposed on the PCB 201 and electrically coupled to the transmitter 210 for transmitting the input signal, and a plurality of source drivers 220 formed in a COF architecture disposed between the PCB 201 and the display panel 202. The input signal is an encoded signal including first and second Gamma reference voltages, VHigh and VLow, control signals, and image data. The driving circuit 200 is implemented with differential transmission of the Gamma voltages, the image data and the control signals. The first and second Gamma reference voltages VHigh and VLow are transmitted by the PLC technology through the first and second transmission lines 231 and 232, respectively. In one embodiment, the image data and the control signals are transmitted through a high pass filter (not shown) of the transmitter 210 to the first and second transmission lines 231 and 232.

As shown in FIG. 2B, each source driver 220 comprises first and second Hi-z components 221 and 222 electrically coupled to the first and second transmission lines 231 and 232, respectively, first and second low pass filters 223 and 224 electrically coupled to the first and second Hi-z components 221 and 222, respectively, a plurality of resistors 225 electrically coupled in series between the first and second low pass filters 223 and 224, a receiver 226 having first and second inputs 226a and 226b electrically coupled to the first and second transmission lines 231 and 232, respectively, and core circuits 227 electrically coupled to the plurality of resistors 225 and the receiver 226.

The Gamma reference voltages VHigh and VLow are transmitted to each source driver 220 through embedded first and second Hi-z components 221 and 222 that are adapted for preventing voltage drops of the input signal because of the length difference between the Gamma voltage transmission paths, so as to prevent Mura phenomena from occurring. Generally, the transmission paths are designed as short as possible. The first and second low pass filters 223 and 224 are adapted for removing high frequency components of the input signal so as to provide the first and second reference voltages for the Gamma voltages. For example, in one embodiment, for a 200 Hz and 16V input signal, after passing the LPF, the output is about 15.8V, while for a 200 kHz and 16V input signal, after passing the LPF, the output is about 126 mV. The high frequency signals are filtered out significantly. The plurality of resistors 225 is adapted for generating a plurality of Gamma voltages. The receiver 226 is adapted for removing DC components of the input signal and outputting the image data and the control signals. The core circuits 227 are adapted for generating gray-scale voltages responsive to the image data for driving corresponding data lines of the display panel 202.

In addition, each source driver 220 may further include a pair of capacitors, Cc, each capacitor Cc electrically coupled between a respective transmission line 231 (232) and a respective input 226a (226b) of the receiver 226, for removing DC component of the input signal and passing AC component of the input signal, a terminal supply voltage, Vterm, and one or more resistors, R0, electrically coupled between the terminal supply voltage Vterm and the first and second inputs 226a and 226b of the receiver 226, for setting a voltage on receiver side of the pair of capacitors Cc. The capacitor Cc coupled before RX removes the DC component of the signal, while the AC voltage swing is passed on. The resistor R0 to the terminal voltage Vterm coupled before RX represents the biasing structure used to set the voltage on the receiver side of the ac-coupling capacitor Cc. The coupling capacitors Cc prevent DC current from flowing from the termination voltage Vterm through CML driver. The common-mode voltage can be adjusted by the termination voltage Vterm.

Figure 3:
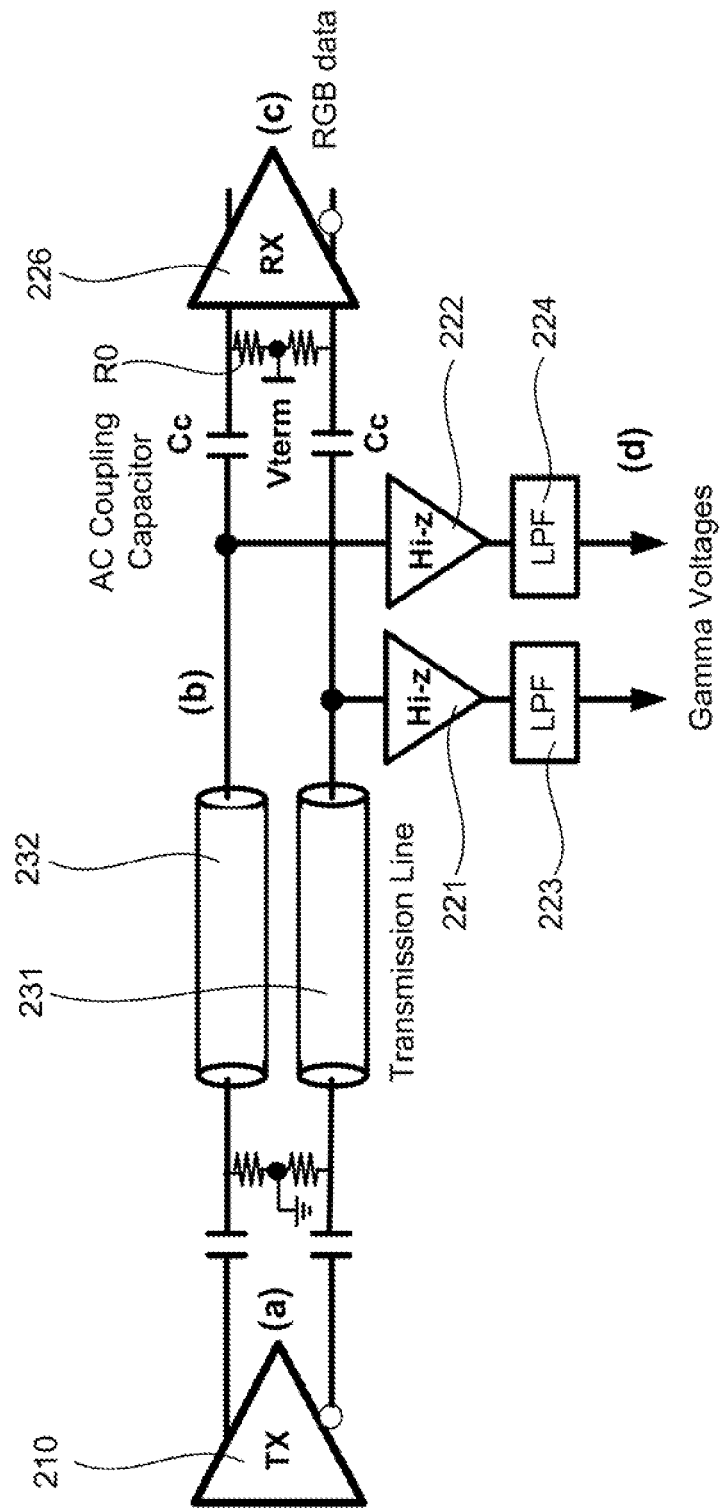
FIG. 3 shows schematically the driving circuit as shown in FIG. 1.
Figure 4:
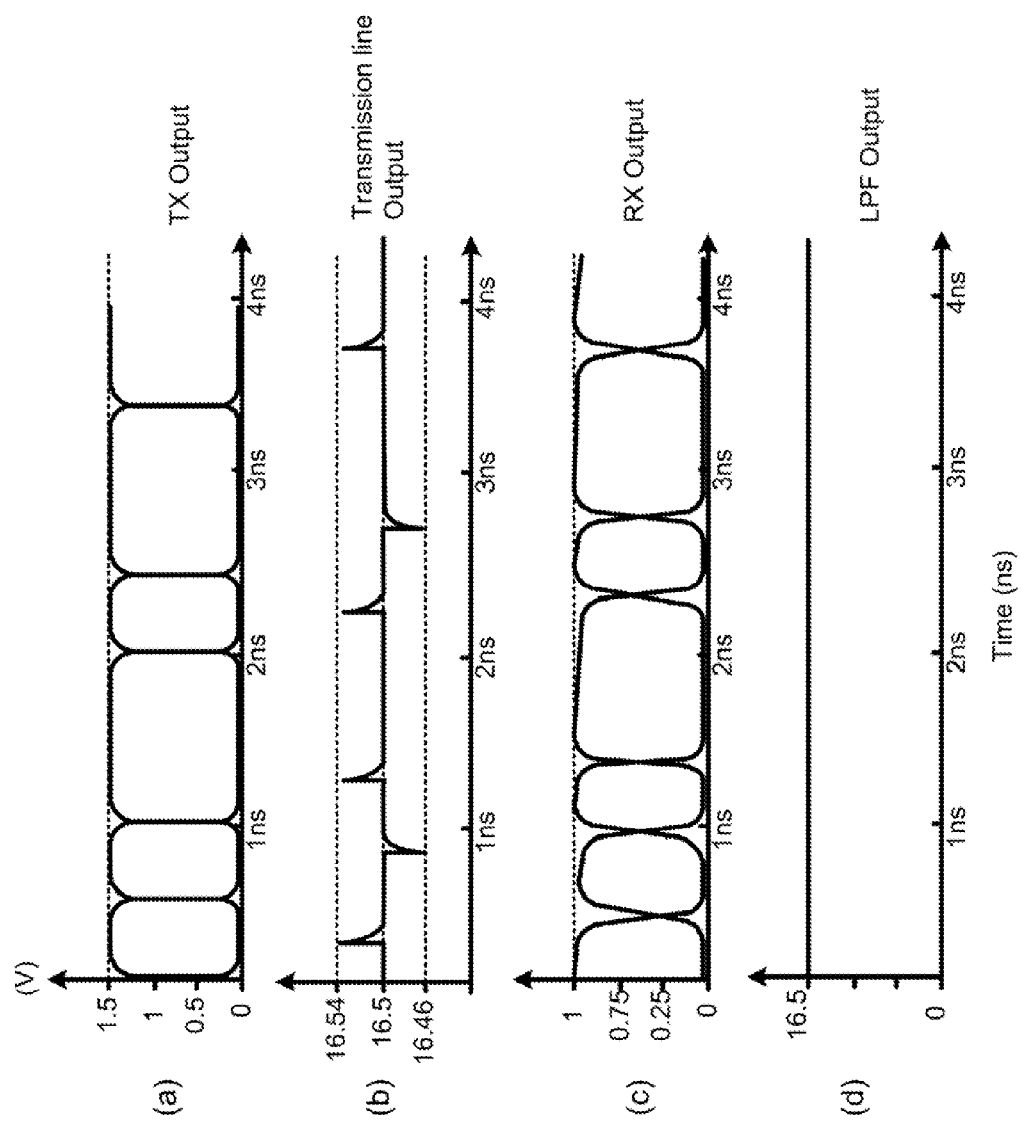
FIG. 4 shows signals at nodes (a), (b), (c) and (d) of the driving circuit of FIG. 3.

FIG. 3 shows schematically the driving circuit as shown in FIG. 1. FIG. 4 shows signal outputs at nodes (a), (b), (c) and (d) of the driving circuit of FIG. 3. Clearly, the signal output at the node (c) is corresponding to the RGB data and the control signal, while the signal output at the node (d) is the DC Gamma reference voltage.

Figure 5:
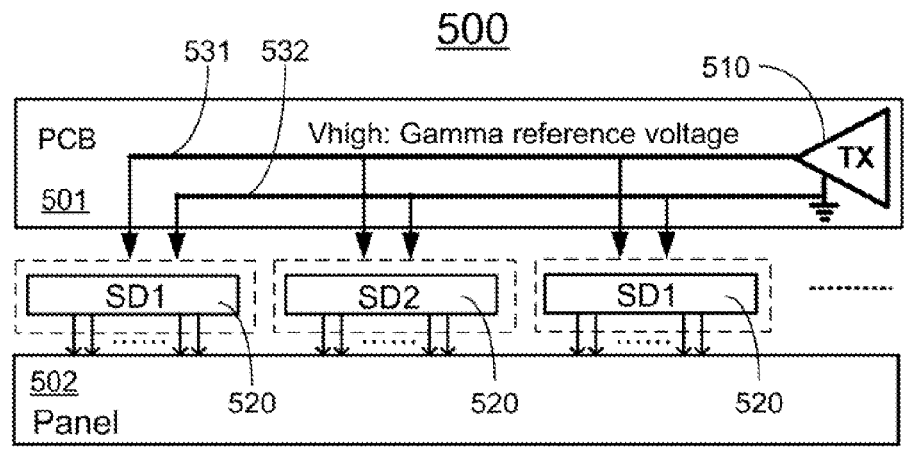
FIG. 5 shows schematically a COF architecture of a driving circuit for a display device that utilizes the PLC technology to transmit RGB data, Gamma voltages and control signals, according to another embodiment of the present invention, (A) the driving circuit, and (B) a source driver, (C) a comparator, and (D) a waveform of the control signal.
Figure 5:
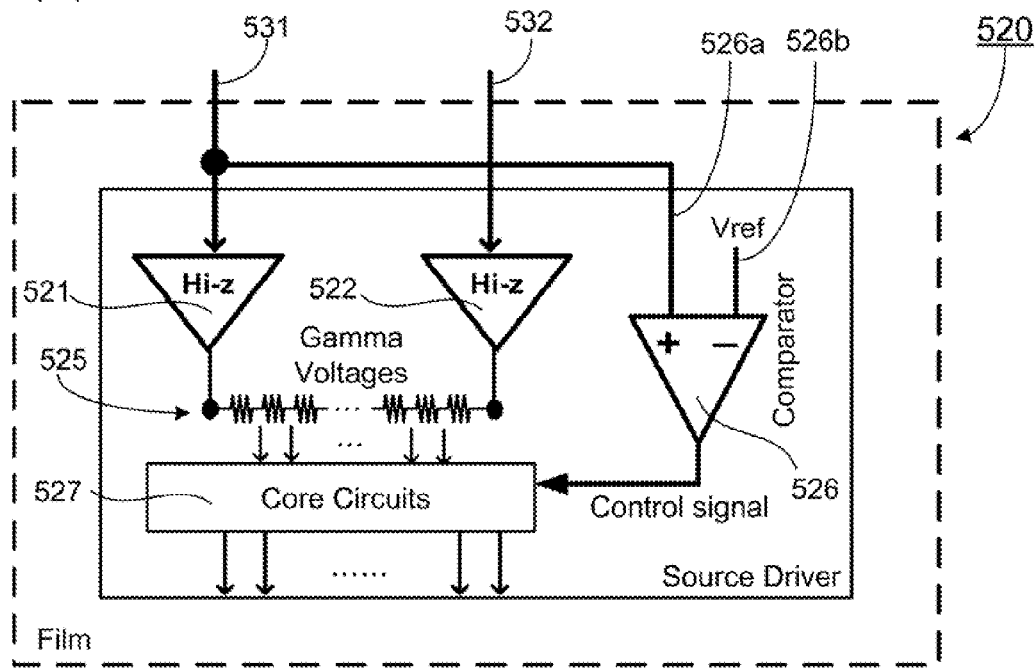
Figure 5:
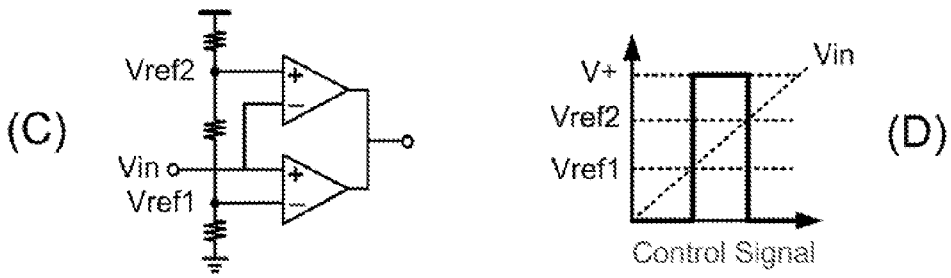

Referring to FIG. 5, a driving circuit 500 for driving a display device having a display panel is schematically shown according to another embodiment of the invention. The driving circuit 500 includes a PCB 501, a transmitter 510 disposed on the PCB 501 for providing an input signal first and second transmission lines 531 and 532 disposed on the PCB 501 and electrically coupled to the transmitter 510 for transmitting the input signal, and a plurality of source drivers 520 formed in a COF architecture between the PCB 501 and the display panel 502. In one embodiment of the invention, the first Gamma reference voltage VHigh and control signals are encoded in the transmitter 510. The first Gamma reference voltage VHigh is transmitted through the first transmission line 531. In addition, the second transmission line 532 is electrically coupled to ground. Thus, the second Gamma reference voltage VLow is a ground voltage, or zero. The driving circuit 500 is corresponding to a single-end control signal transmission.

As shown in FIG. 5B, each source driver 520 has first and second Hi-z components 521 and 522 electrically coupled to the first and second transmission lines 531 and 532, respectively, for preventing voltage drops of the input signal, and outputting the first and second Gamma reference voltages, a plurality of resistors 525 electrically coupled in series between the first and second low pass filters 521 and 522, for generating a plurality of Gamma voltages, a comparator 526 having first and second inputs 526a and 526b electrically coupled to the first transmission line 531 and a reference voltage Vref, respectively, for outputting the control signals, and core circuits 527 electrically coupled between the plurality of resistors 525 and the comparator for generating gray-scale voltages for driving corresponding data lines of the display panel. The first and second Hi-z components 521 and 522 may be embedded in the driver IC and are adapted for preventing the Gamma reference voltage drops. FIGS. 5C and 5D show schematically a circuit diagram of the comparator 526 and the waveform of its output signal, respectively. In this exemplary embodiment, one reference voltage Vref provided externally or internally is required, which is employed as a reference for the comparator 526. In operation, the comparator 526 decodes the control signal from the encoded Gamma reference voltages and the control signal, and then transmits the decoded control signal to the core circuit 527.

Figure 6:
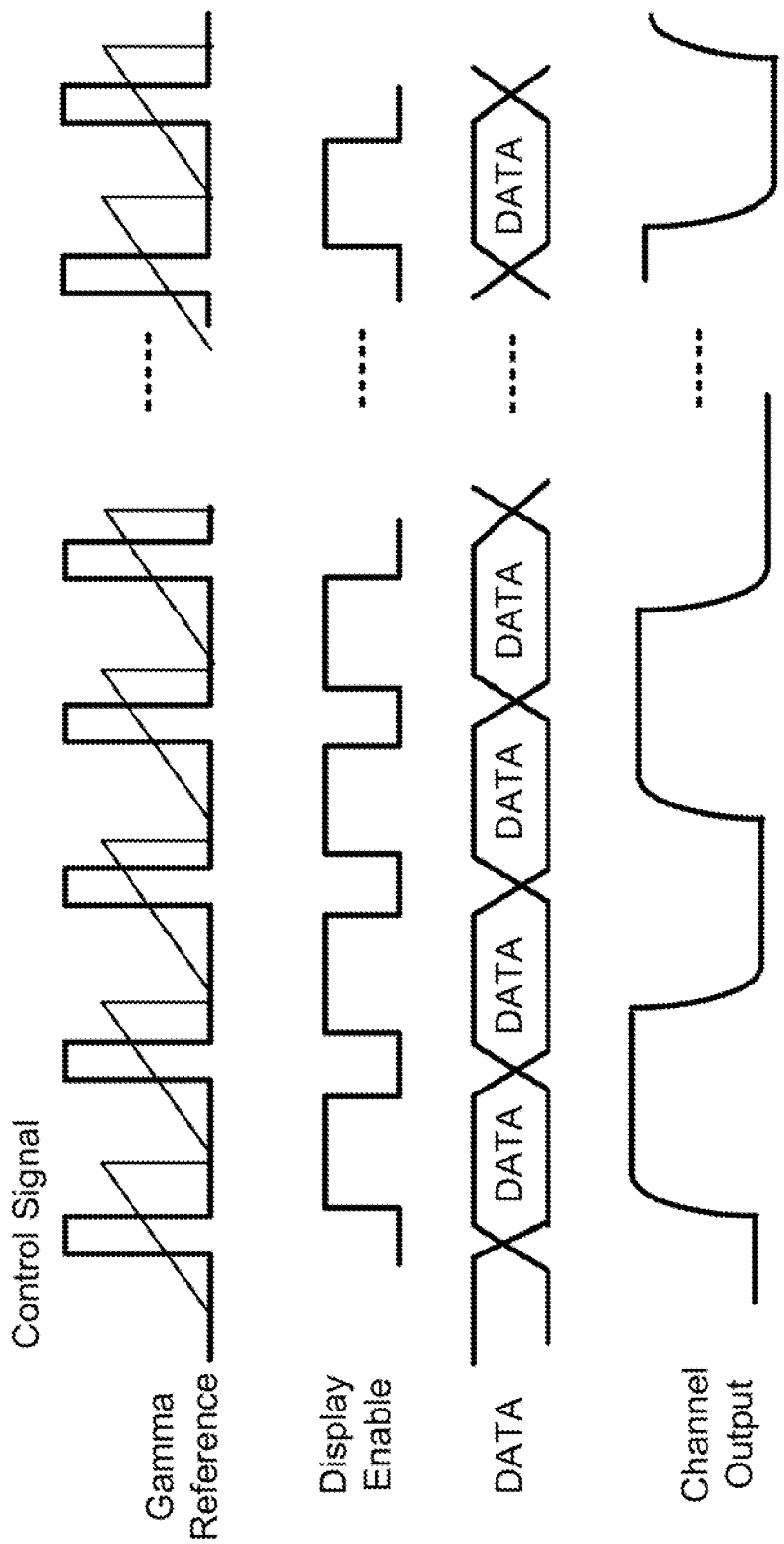
FIG. 6 shows schematically waveforms of input signals and output signals of the driving circuit shown in FIG. 5.

FIG. 6 shows schematically waveforms of input signals such as image data, Gamma reference voltages, control signal (STB) and channel output signals of the driving circuit shown in FIG. 5.

Figure 7:
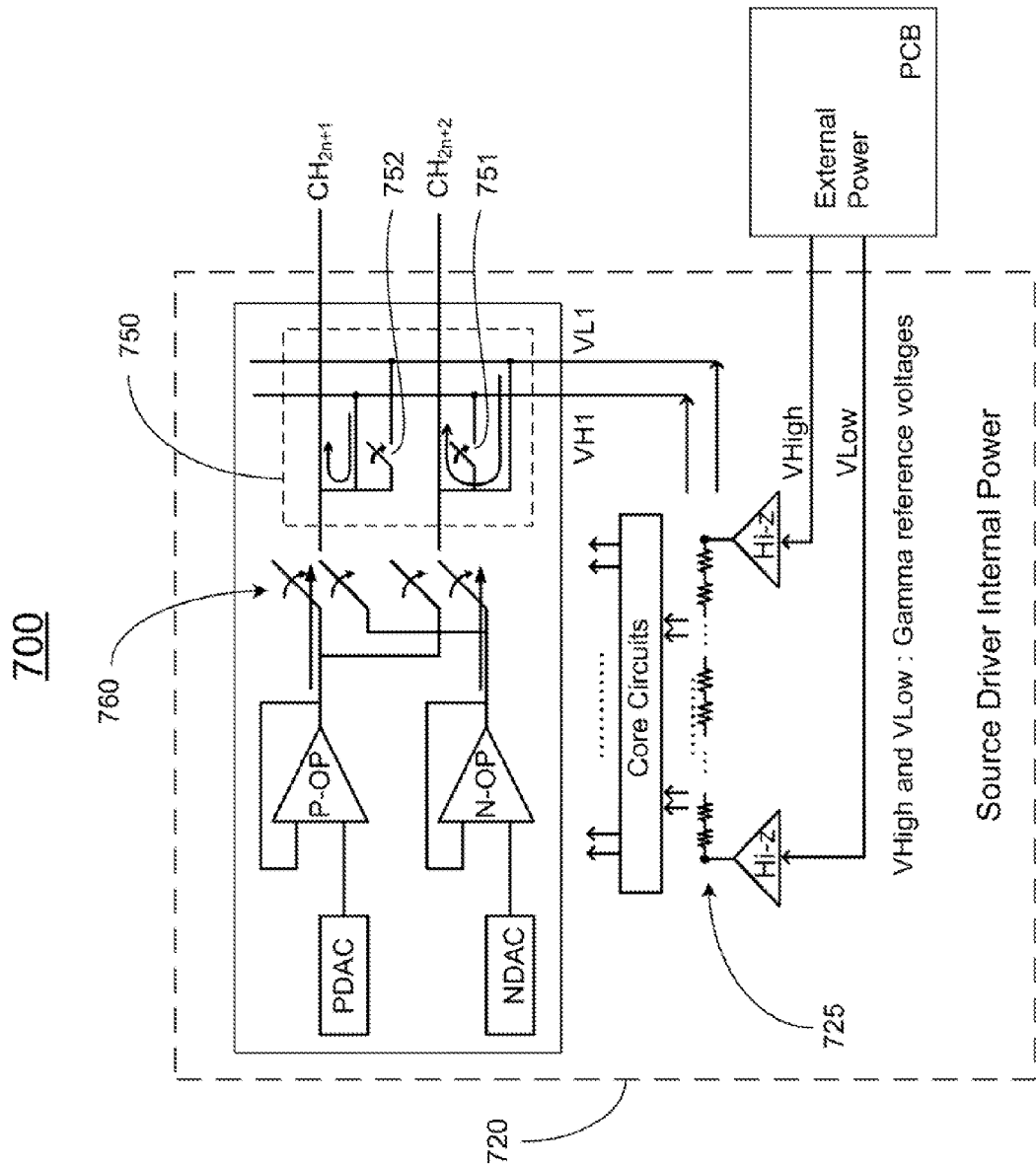
FIG. 7 shows schematically a driving circuit having a pre-charging function according to another embodiment of the present invention.

In addition, according to the invention, the driving circuit 700 also has an MSB pre-charging function/circuit 750, as shown in FIG. 7 In one embodiment, the MSB pre-charging circuit 750 is configured such that when the MSB of the image data applied to a data line (e.g., $C_{2n+2}$) and the MSB of the image data applied to the immediately prior data line (e.g., $C_{2n+1}$) change from one state to another state (i.e., from "0" to "1", or from "1" to "0"), pre-charging to the data lines starts for a pre-charge period, T. The pre-charging period T is substantially coincident with a high-z time of the control signal STB.

Power of the pre-charging is supplied by internal sources of voltages, VH1 and VL1, which are provided by the Gamma resistor-string 725 of the source driver 720. The voltage sources VH1 and VL1 are designed to respectively satisfy the relationships of:

$$(½)*VHigh<VH1<VHigh, \text{ and}$$

$$VLow<VL1<(½)*VHigh.$$

Preferably, VH1=(¾)*VHigh and VL1=(¼)*VHigh.

In one embodiment, when a channel output to a data line has a positive polarity, the data line is pre-charged with VH1 in the high-z time of the control signal STB, and when a channel output to a data line has a negative polarity, the data line is pre-charged with VL1 in the high-z time of the control signal ST, which are controlled by switches 751 and 752 of the pre-charging circuit 750, as shown in FIG. 7. The polarity of a channel output is generally controlled by a group of switches 760.

Figure 8:
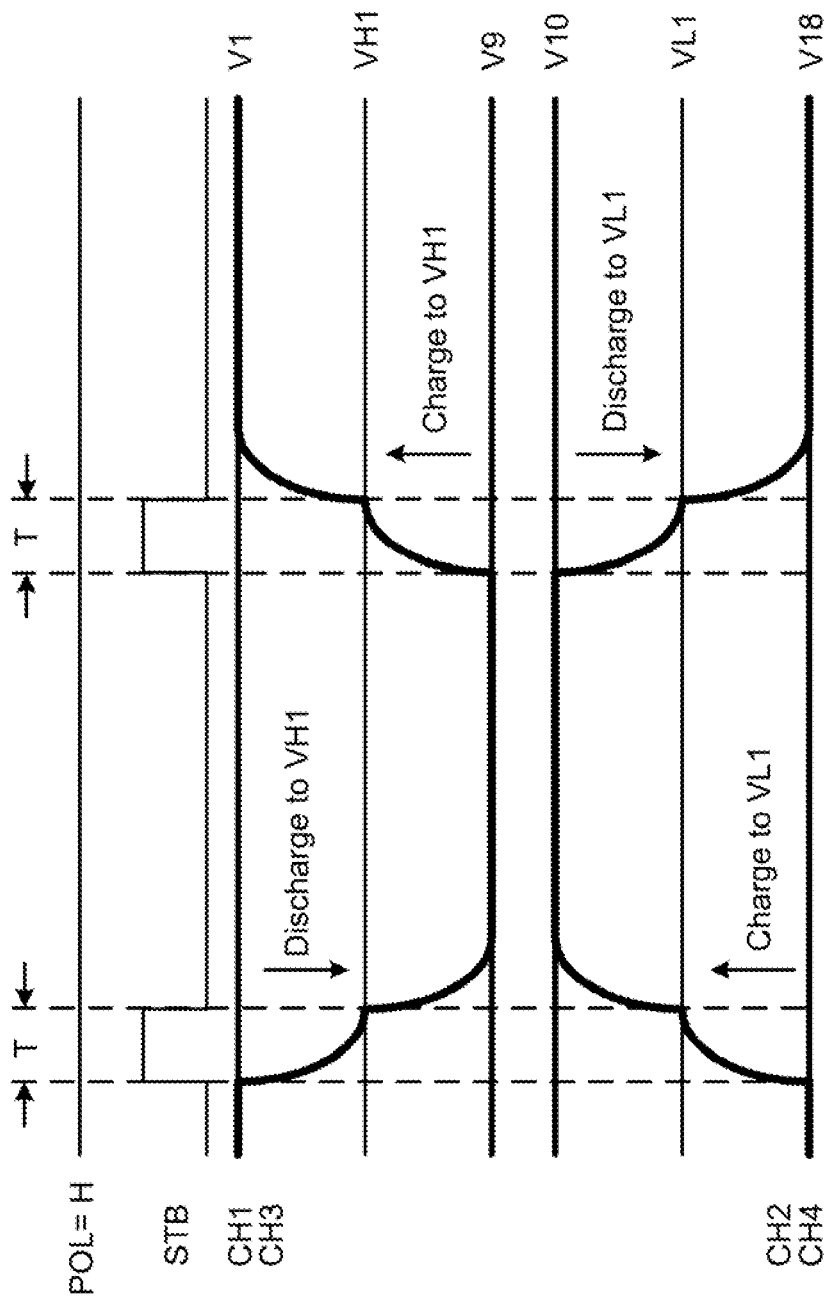
FIG. 8 shows schematically waveforms of pre-charging signals according to another embodiment of the present invention.
Figure 9:
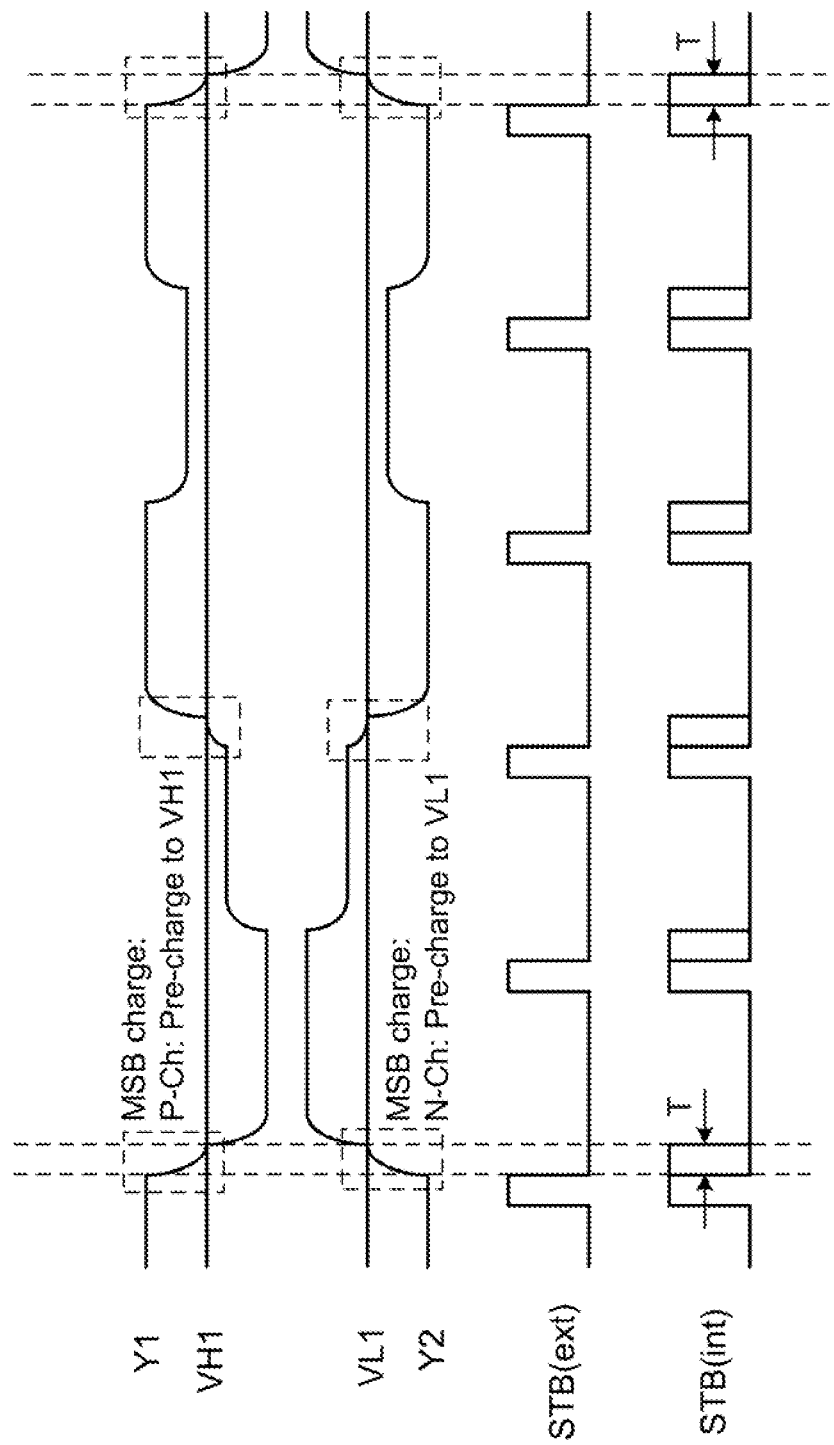
FIG. 9 shows schematically waveforms of pre-charging signals according to another embodiment of the present invention.

FIGS. 8 and 9 show the waveforms of the pre-charging signals. As the MSB inverted, then do pre-charging on STB falling N-clk width, and then out data waveform. As the MSB doesn't inverted, then enlarge STB pulse with N-clk width (by PCE setting), and output data waveform at STB falling.

According to the invention, voltage levels of channel outputs of the source drivers are pre-charged to voltages VH1 and VL1, by using a pre-charging mechanism and two power sources VH1 and VL1 provided by an internal resistor-string for dividing Gamma voltages, thereby, reducing the power consumption and operation temperature of the source driver IC, which solves the problem of heating conduction of the film due to the high temperature of the film in the COF architecture.

Table 1 lists experimental results of temperatures (° C.) of the COF drivers with or without pre-charging for H-stripe, sub-checker and one-dot patterns. It is clearly shown that with the pre-charging, the temperature can be reduced from 39.7° C. to 42.5° C. for the pre-charging period of 1.47 µs, and from 20.2° C. to 24.7° C. for the pre-charging period of 0.47 µs.

TABLE 1

Temperatures (° C.) of pre-charging effect.

| Pattern | | H-stripe | Sub-checker MSB state charges | One-dot |
|---|---|---|---|---|
| Pre-charging period 1.47 µs | No pre-charging | 145.8 | 133 | 137.1 |
| | Pre-charging | 103.6 | 93.3 | 94.6 |
| | Temperature decrease | 42.2 | 39.7 | 42.5 |
| Pre-charging period 0.47 µs | No pre-charging | 132.5 | 122 | 122.6 |
| | Pre-charging | 112.3 | 97.3 | 100.2 |
| | Temperature decrease | 20.2 | 24.7 | 22.4 |

Figure 10:
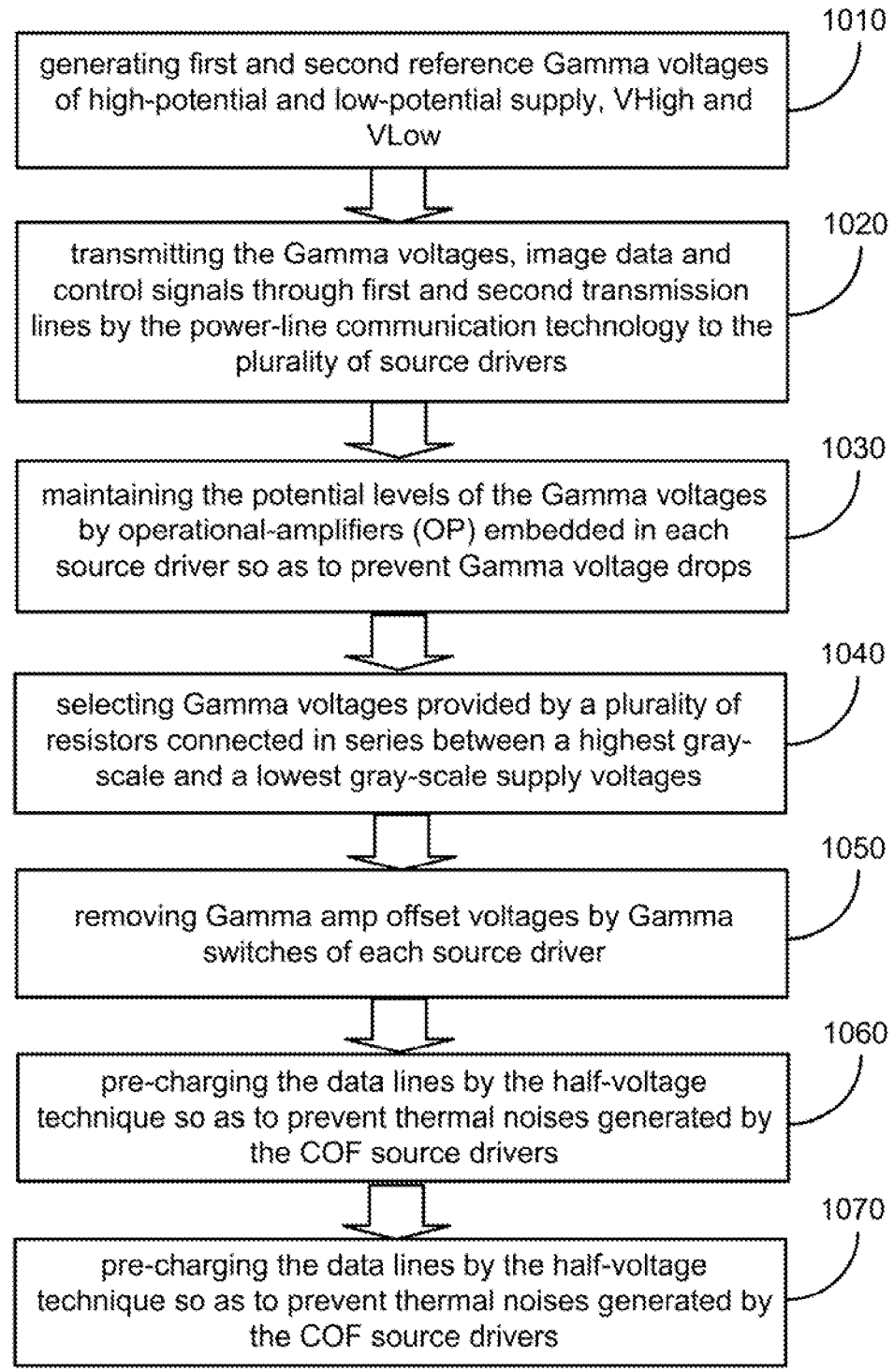
FIG. 10 shows schematically a flowchart of a method for driving a display device according to another embodiment of the present invention.

Referring to FIG. 10, a method 1000 for driving a display device having a plurality of source drivers formed in a COF architecture is shown according to one embodiment of the invention. The method 1000 includes the following steps:

At step 1010, first and second reference Gamma voltages VHigh and VLow of high-potential and low-potential supply are generated or provided from an external power source. The first and second reference Gamma voltages VHigh and VLow are corresponding to a highest gray-scale voltage and a lowest gray-scale supply voltage, respectively.

At step 1020, the Gamma voltages, image data and control signals are transmitted through first and second transmission lines by the power-line communication technology to the plurality of source drivers.

At step 1030, the potential levels of the Gamma voltages are maintained by operational-amplifiers (OP) embedded in each source driver so as to prevent Gamma voltage drops.

At step 1040, Gamma voltages provided by a plurality of resistors connected in series between a highest gray-scale voltage and a lowest gray-scale supply voltage are selected. In one embodiment, the selecting of the Gamma voltages is performed with a plurality of Gamma voltage selectors.

At step 1050, Gamma amp offset voltages are removed by Gamma switches of each source driver.

At step 1060, pre-charging the data lines by the half-voltage technique so as to prevent thermal noises generated by the COF source drivers. The power of the pre-charging is supplied by internal sources of voltages, VH1 and VL1, which are provided by the Gamma resistor-string. The voltages VH1 and VL1 are designed to respectively satisfy the relationships of:

$$(½)*VHigh<VH1<VHigh, \text{ and}$$

$$VLow<VL1<(½)*VHigh.$$

Preferably, VH1=(¾)*VHigh and VL1=(¼)*VHigh.

In one embodiment, when the MSB of the image data applied to a data line and the MSB of the image data applied to the immediately prior data line change from one state to another state, the pre-charging to the data lines starts for a pre-charge period. The pre-charging period is substantially coincident with a high-z time of the control signal STB.

Additionally, when a channel output to a data line has a positive polarity, the data line is pre-charged with VH1 in the high-z time of the control signal STB, and when a channel output to a data line has a negative polarity, the data line is pre-charged with VL1 in the high-z time of the control signal STB.

At step 1070, gray-scale voltages are generated for channel outputs from core circuits of each source driver to a display panel of the display device.

Figure 11:
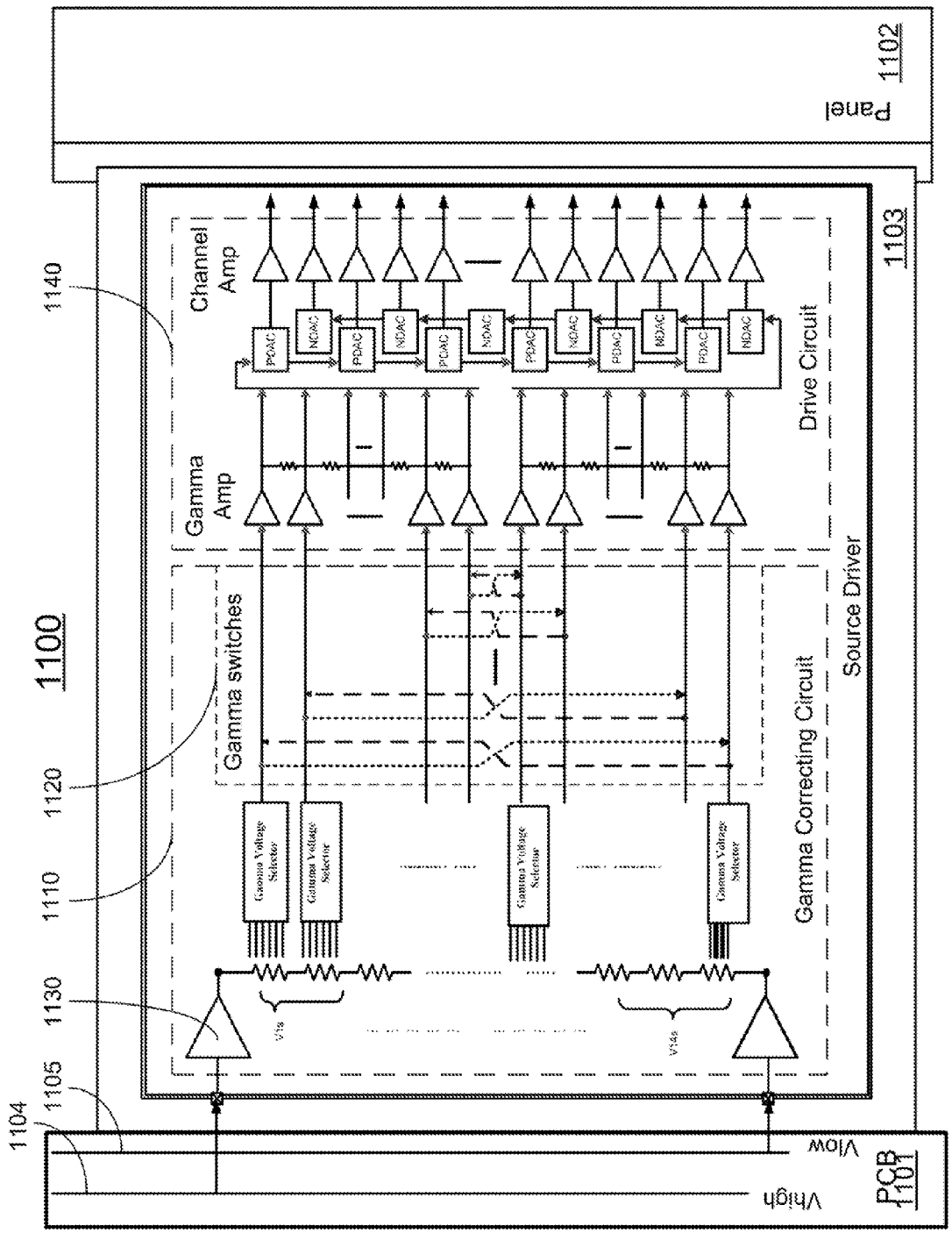
FIG. 11 shows schematically display panel architecture according to another embodiment of the present invention.

Referring to FIG. 11, display panel architecture 1100 is shown schematically according to another embodiment of the present invention. The display panel architecture 1100 includes a PCB 1101, first and second transmission lines 1104 and 1105 disposed on the PCB 1101 for transmitting the input signal including two Gamma reference voltages, RGB data and control signals, a COF architecture 1103 of source drivers disposed between the PCB 1101 and the display panel 1102. The source drivers include Gamma correct circuit 1110 that has embedded Gamma OPs 1130 electrically coupled to the first and second transmission lines 1104 and 1105 for preventing the Gamma voltage drops, Gamma switches 1120 for cancelling Gamma AMP offset voltages. The source drivers also include source driver circuit 1140 electrically coupled to the Gamma correcting circuit 1110 responsively for generating gray-scale voltages to drive the data lines of the display panel 1102.

Briefly, the invention, among other things, recites a driving circuit for driving a display device, which utilizes the PLC technology in the Gamma voltage transmission lines (paths) to transmit the Gamma voltages, image (RGB) data and control signals. The image data and the control signals encoded by differential or single-end transmission methods, to the Gamma voltages. The encoded image data and control signals and the Gamma voltages are transmitted through the Gamma voltage transmission lines (paths). Accordingly, the wires needed for the signal transmission on the PCB are reduced, and thus, the size of the PCB can be reduced. In addition, according to the invention, voltage levels of channel outputs of the source drivers are pre-charged to voltages VH1 and VL1, by using a pre-charging mechanism and two power sources VH1 and VL1 provided by an internal resistor-string for dividing Gamma voltages, thereby, reducing the power consumption and operation temperature of the source driver IC, which solves the problem of heating conduction of the film due to the high temperature of the film in the COF architecture.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A driving circuit for driving a display device having a display panel, comprising:
   (a) a printed circuit board (PCB);
   (b) a transmitter disposed on the PCB for providing an input signal comprising first and second Gamma reference voltages, VHigh and VLow;
   (c) first and second transmission lines disposed on the PCB and electrically coupled to the transmitter for transmitting the input signal, wherein the first and second Gamma reference voltages are transmitted through the first and second transmission lines, respectively; and
   (d) a plurality of source drivers formed in a chip-on-film (COF) architecture between the PCB and the display panel, wherein each source driver comprises:
   first and second Hi-z components electrically coupled to the first and second transmission lines, respectively, for preventing voltage drops of the input signal,
      wherein the input signal further comprises control signals, and image data, and
      wherein each source driver further comprises:
      first and second low pass filters electrically coupled to the first and second Hi-z components, respectively, for removing high frequency components of the input signal and outputting the first and second Gamma reference voltages;
   a plurality of resistors electrically coupled in series between the first and second low pass filters, for generating a plurality of Gamma voltages;
      a receiver having first and second inputs electrically coupled to the first and second transmission lines, respectively, for removing DC components of the input signal and outputting the image data and the control signals; and
   core circuits electrically coupled to the plurality of resistors and the receiver for generating gray-scale voltages responsive to the image data for driving corresponding data lines of the display panel.

2. The driving circuit of claim 1, wherein the image data and the control signals are transmitted through a high pass filter of the transmitter to the first and second transmission lines.

3. The driving circuit of claim 1, wherein each source driver further comprises:
   (a) a pair of capacitors, each capacitor electrically coupled between a respective transmission line and a respective input of the receiver, for removing DC component of the input signal and passing AC component of the input signal;
   (b) a terminal supply voltage; and
   (c) one or more resistors electrically coupled between the terminal supply voltage and the first and second inputs of the receiver, for setting a voltage on receiver side of the pair of capacitors.

4. The driving circuit of claim 3, wherein each source driver further comprises a pre-charging circuit configured such that when the most significant bit (MSB) of the image data applied to a data line and the MSB of the image data applied to the immediately prior data line change from one state to another state, pre-charging to the data lines starts for a pre-charge period.

5. The driving circuit of claim 4, wherein power of the pre-charging is supplied by internal voltages, VH1 and VL1, provided by the plurality of resistors.

6. The driving circuit of claim 5, wherein the voltages VH1 and VL1 are designed to respectively satisfy the relationships of:

$$(\tfrac{1}{2})*V\text{High} < V\!H1 < V\text{High, and}$$

$$V\text{Low} < VL1 < (\tfrac{1}{2})*V\text{High}.$$

7. The driving circuit of claim 6, wherein $VH1=(\tfrac{3}{4})*V\text{High}$ and $VL1=(\tfrac{1}{4})*V\text{High}$.

8. The driving circuit of claim 4, wherein the pre-charging period is substantially coincident with a high-z time of the control signal STB.

9. The driving circuit of claim 8, wherein when a channel output to a data line has a positive polarity, the data line is pre-charged with VH1 in the high-z time of the control signal STB, and when a channel output to a data line has a negative polarity, the data line is pre-charged with VL1 in the high-z time of the control signal STB.

10. A method for driving a display device having a plurality of source drivers formed in a chip-on-film (COF) architecture, comprising the steps of:
   (a) generating first and second reference Gamma voltages of high-potential and low-potential supply, VHigh and VLow, wherein VHigh and VLow are corresponding to a highest gray-scale voltage and a lowest gray-scale supply voltage, respectively;
   (b) transmitting the Gamma voltages through first and second transmission lines by the power-line communication technology to the plurality of source drivers;
   (c) maintaining the potential levels of the Gamma voltages by operational-amplifiers (OP) embedded in each source driver so as to prevent Gamma voltage drops;
   (d) selecting Gamma voltages provided by a plurality of resistors connected in series between a highest gray-scale voltage and a lowest gray-scale supply voltage; and (e) removing Gamma amp offset voltages by Gamma switches of each source driver,
   wherein when the most significant bit (MSB) of the image data applied to a data line and the MSB of the image data applied to the immediately prior data line change from one state to another state, the pre-charging to the data lines starts for a pre-charge period.

11. The method of claim 10, further comprising transmitting image data and control signals through first and second transmission lines by the power-line communication technology to the plurality of source drivers.

12. The method of claim 11, further comprising
   (a) pre-charging the data lines by the half-voltage technique so as to prevent thermal noises generated by the COF source drivers; and
   (b) generating gray-scale voltages for channel outputs from core circuits of each source driver to a display panel of the display device.

13. The method of claim 10, wherein the step of selecting Gamma voltages is performed with a plurality of Gamma voltage selectors.

14. The method of claim 10, wherein the pre-charging period is substantially coincident with a high-z time of the control signal STB.

15. The method of claim 14, wherein when a channel output to a data line has a positive polarity, the data line is pre-charged with VH1 in the high-z time of the control signal STB, and when a channel output to a data line has a negative polarity, the data line is pre-charged with VL1 in the high-z time of the control signal STB.

16. The method of claim 15, wherein power of the pre-charging is supplied by internal voltages, VH1 and VL1, provided by the plurality of resistors.

17. The method of claim 16, wherein the voltages VH1 and VL1 are designed to respectively satisfy the relationships of:

$$½)*V\text{High} < V\!H1 < V\text{High, and}$$

$$V\text{Low} < V\!L1 < (½)*V\text{High.}$$

18. The method of claim 17, wherein VH1=(¾)*VHigh and VL1=(¼)*VHigh.

* * * * *